(12) United States Patent
Nakane et al.

(10) Patent No.: US 6,928,887 B2
(45) Date of Patent: Aug. 16, 2005

(54) TORQUE SENSOR

(75) Inventors: Naoki Nakane, Toyota (JP); Shigetoshi Fukaya, Toyota (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 10/673,278

(22) Filed: Sep. 30, 2003

(65) Prior Publication Data

US 2004/0074316 A1 Apr. 22, 2004

(30) Foreign Application Priority Data

Oct. 7, 2002 (JP) ........................................ 2002-293181

(51) Int. Cl.[7] .............................. G01L 3/02; G01L 3/10; G01L 3/12; G01L 3/14
(52) U.S. Cl. .................................................. 73/862.331
(58) Field of Search ...................... 73/862.335, 862.333, 73/862.336, 862.331, 862.325; 29/602.1; 180/444

(56) References Cited

U.S. PATENT DOCUMENTS

| | | | |
|---|---|---|---|
| 4,784,002 A | | 11/1988 | Io |
| 4,984,474 A | | 1/1991 | Matsushima et al. |
| 5,351,555 A | * | 10/1994 | Garshelis ................ 73/862.335 |
| 5,641,916 A | * | 6/1997 | Satoh et al. ............ 73/862.331 |
| 5,705,756 A | * | 1/1998 | LeMarquand et al. . 73/862.332 |
| 6,026,925 A | * | 2/2000 | Nagao et al. ................ 180/444 |
| 6,581,479 B2 | * | 6/2003 | Goto et al. ............. 73/862.331 |
| 6,644,134 B2 | * | 11/2003 | Laidlaw et al. ......... 73/862.331 |
| 6,729,433 B2 | * | 5/2004 | Uryu et al. .................. 180/444 |
| 2002/0189371 A1 | | 12/2002 | Nakane et al. |

FOREIGN PATENT DOCUMENTS

| | | |
|---|---|---|
| JP | 2613449 | 2/1997 |
| JP | 2003-149062 | 5/2003 |
| WO | WO02/071019 A1 | 9/2002 |

* cited by examiner

*Primary Examiner*—Max Noori
*Assistant Examiner*—Octavia Davis
(74) *Attorney, Agent, or Firm*—Posz Law Group, PLC

(57) ABSTRACT

A first shaft and a second shaft are connected coaxially. A torsion bar converts a torque applied between two shafts into a torsion displacement. A multipolar magnet is fixed to the first shaft. One set of magnetic yokes is fixed to the second shaft and disposed in a magnetic field generated by the multipolar magnet. One set of flux collecting rings is disposed along an outer surface of the set of magnetic yokes and opposed to each other via an air gap in an axial direction. A magnetic sensor is provided for detecting the density of magnetic flux generated in the air gap. An outer cylindrical surface of the set of flux collecting rings is surrounded by a magnetic shield.

36 Claims, 9 Drawing Sheets

MAGNETIC SHIELD 18 FIXED AROUND MOLDING MEMBER 17

TORQUE SENSOR

BACKGROUND OF THE INVENTION

This invention relates to a torque sensor detecting a shaft torque applied to a rotary shaft as change of magnetic flux density (i.e., strength of magnetic field).

As a conventional technique, Japanese Patent Application Laid-open No. 2003-149062 (FIG. 15) discloses a torque sensor.

This torque sensor is, for example, used for a motor-driven power steering apparatus. As shown in FIG. 11, an input shaft 100 and an output shaft 110 are coaxially connected by a torsion bar 120. A multipolar magnet 130 is fixed to the input shaft 100. One set of magnetic yokes 140, fixed to the output shaft 110, is disposed in a magnetic field generated from the multipolar magnet 130. One set of flux collecting rings 150 collecting magnetic fluxes generated from the magnetic yokes 140. A magnetic sensor 160 detects the density of magnetic flux generated in an air gap between the opposed flux collecting rings 150.

The above-described conventional torque sensor, if it is positioned closely to a car speaker or a comparable magnet member, may generate an erroneous signal due to influence of magnetic field generated from these magnetic member. Hence, according to the above prior art document, the torque sensor is enclosed by a magnetic material 170 serving as a magnetic shield to eliminate erroneous detection caused by the adverse influences of the geomagnetism or the magnetic field generated around the torque sensor.

However, according to the magnetic shield disclosed in the above-described prior art document, a magnetic circuit of the torque sensor is entirely enclosed by the magnetic material 170. The outer diameter of the torque sensor becomes large and accordingly installability of the torque sensor to an automotive vehicle is worsened. In other words, the above-described conventional torque sensor is not practically applicable for mass production. Furthermore, it is not clear how this torque sensor is installed.

SUMMARY OF THE INVENTION

In view of the above-described problems, the present invention has an object to provide a torque sensor having a magnetic shielding structure preferable employable for mass production.

In order to accomplish the above and other related objects, the present invention provides a torque sensor including a first shaft and a second shaft connected coaxially, a torsion bar converting a torque applied between the first shaft and the second shaft into a torsion displacement, and a multipolar magnet fixed to the first shaft or to one end of the torsion bar. One set of magnetic yokes is fixed to the second shaft or to the other end of the torsion bar and disposed in a magnetic field generated by the multipolar magnet. One set of flux collecting rings are disposed along an outer surface of the magnetic yokes and opposed to each other via an air gap in an axial direction. A magnetic sensor is provided for detecting the density of magnetic flux generated in the air gap. Furthermore, an outer cylindrical surface of the set of flux collecting rings is surrounded by a magnetic shield.

The magnetic sensor detects the density of magnetic flux generated in the air gap of the opposed flux collecting rings. When the flux collecting rings are influenced by the external magnetic field, the magnetic sensor produces an error in detection value. Accordingly, covering the outer cylindrical surface of the set of flux collecting rings makes it possible to effectively eliminate the adverse influence given by the magnetic fields produced by external magnetic members including car speakers.

Furthermore, the magnetic shield does not cover all of the magnetic circuit of the torque sensor. The magnetic shield covers only the outer cylindrical surface of the set of flux collecting rings. The configuration of the magnetic shield can be simplified. Installation of the magnetic shield becomes easy.

Preferably, the magnetic shield has a side portion covering a side surface of the set of flux collecting rings.

Providing the side portion to the magnetic shield is effective to eliminate the adverse influence given by the magnetic fields produced by external magnetic members including car speakers. The detection error of the magnetic sensor can be further reduced.

Preferably, the magnetic shield is integrated with the set of flux collecting rings by resin molding.

As the flux collecting rings are opposed to each other via the air gap, integrating the flux collecting rings together with the magnetic shield by resin molding makes it possible to simplify the installation. This magnetic shielding structure is preferably employable for mass production.

Preferably, the magnetic shield directly covers the outer cylindrical surface of the set of flux collecting rings.

According to this arrangement, the magnetic shield does not cover all of the magnetic circuit of the torque sensor. The magnetic shield directly covers only the outer cylindrical surface of the set of flux collecting rings. The configuration of the magnetic shield can be simplified. Installation of the magnetic shield becomes easy.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiment of the present invention will be explained hereinafter with reference to attached drawings.

First Embodiment

Figure 1:
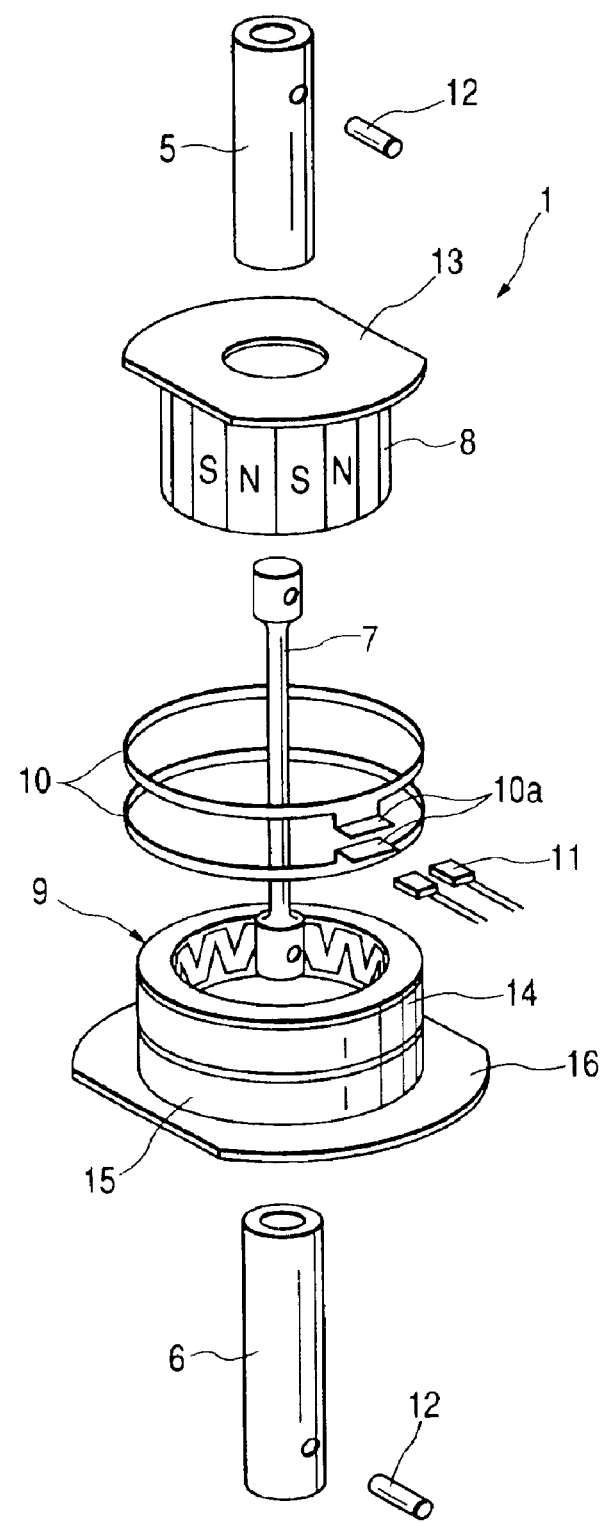
FIG. 1 is an exploded perspective view showing a torque sensor in accordance with a first embodiment of the present invention.
Figure 8:
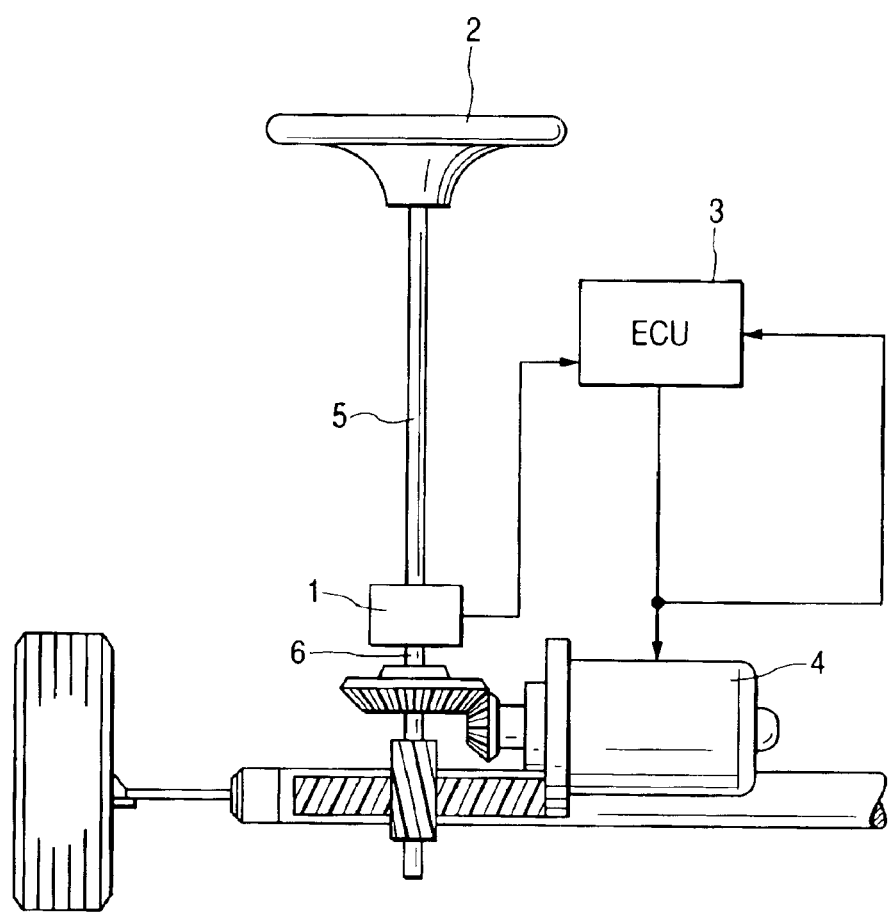
FIG. 8 is a schematic view showing an overall arrangement of a motor-driven power steering apparatus.

FIG. 1 is an exploded perspective view showing a torque sensor 1 in accordance with a preferred embodiment of the present invention. For example, the torque sensor 1 of this embodiment is used for a motor-driven power steering apparatus shown in FIG. 8. The torque sensor 1 detects a steering force (i.e., a shaft torque) of a steering wheel 2, and sends the detected steering force to an ECU (electronic control unit) 3. The ECU 3 controls the output of a motor-driven motor 4 in accordance with the steering force detected by the torque sensor 1.

The torque sensor 1 is provided between an input shaft 5 and an output shaft 6 which cooperatively constitute a steering shaft. As shown in FIG. 1, the torque sensor 1 includes a torsion bar 7, a multipolar magnet 8, one set of magnetic yokes 9, one set of flux collecting rings 10, and a magnetic sensor 11.

Figure 2:
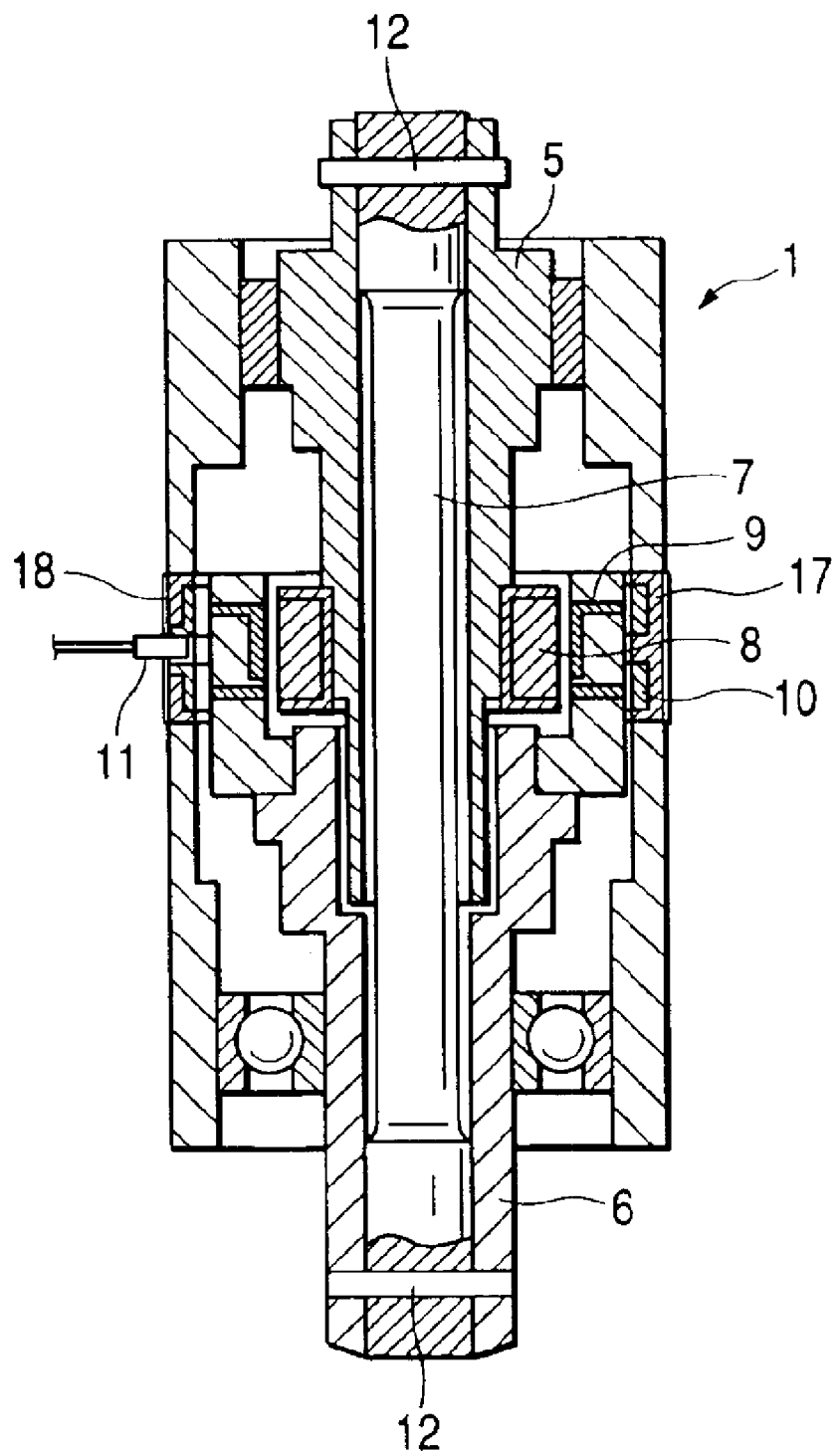
FIG. 2 is a cross-sectional view showing an overall arrangement of the torque sensor in accordance with the first embodiment of the present invention.

As shown in FIG. 2, the torsion bar 7 is an elastic rod member having one end connected to the input shaft 5 via a pin 12 and the other end connected to the output shaft 6 via a pin 12. When a steering torque is applied on the steering shaft, the torsion bar 7 causes a torsion or twist displacement in accordance with the largeness of the applied steering torque.

The multipolar magnet 8 has a ring shape magnetized into alternate N-poles and S-poles arranged in a circumferential direction. A collar 13 is integrated with the multipolar magnet 8 (refer to FIG. 1). The multipolar magnet 8 is press-fitted to the input shaft 5 (or the output shaft 6) via the collar 13.

Figure 3A:
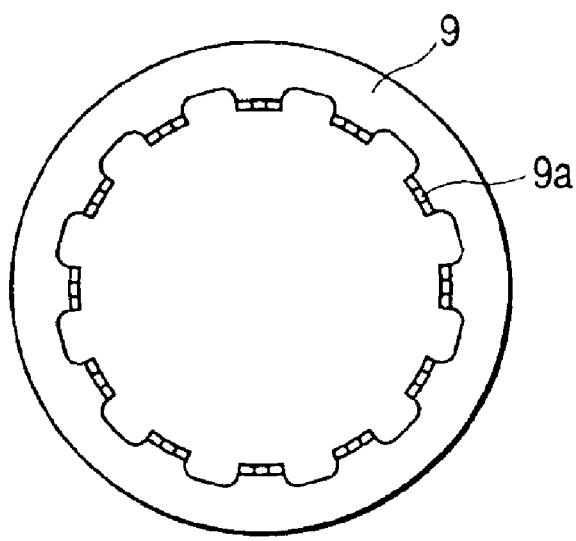
FIG. 3A is a plan view showing a magnetic yoke in accordance with the first embodiment of the present invention.
Figure 3B:
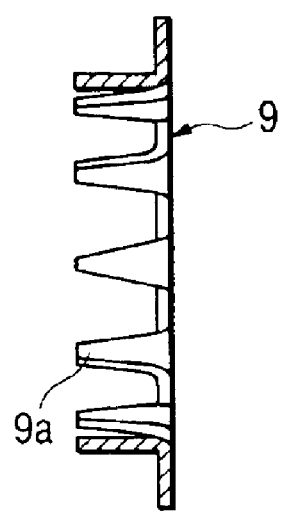
FIG. 3B is a side view showing the magnetic yoke in accordance with the first embodiment of the present invention.

Each of the magnetic yoke 9 is made of a soft magnetic material and, as shown in FIGS. 3A and 3B, has a plurality of claw poles 9a arranged in the circumferential direction at equal intervals.

Figure 4:
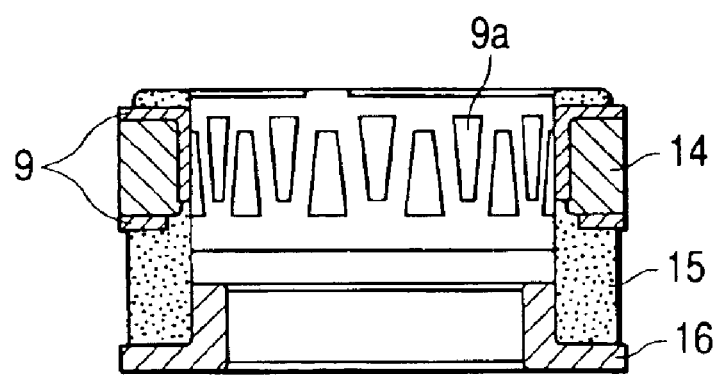
FIG. 4 is a cross-sectional view showing one set of magnetic yokes positioned by a spacer and integrated by resin molding in accordance with the first embodiment of the present invention.

As shown in FIG. 4, two magnetic yokes 9 are coupled as one set of magnetic yokes so that their claw poles 9a mesh with each other. A spacer 14, intervening between the coupled magnetic yokes 9, has a function of positioning the magnetic yokes 9 in the assempled condition. The magnetic yokes 9 and the spacer 14 are integrated by a molding resin 15. One set of magnetic yokes 9 being thus assembled is press-fitted to the output shaft 6 (or the input shaft 5) via a collar 16 fixed to the molding resin 15.

Figure 5A:
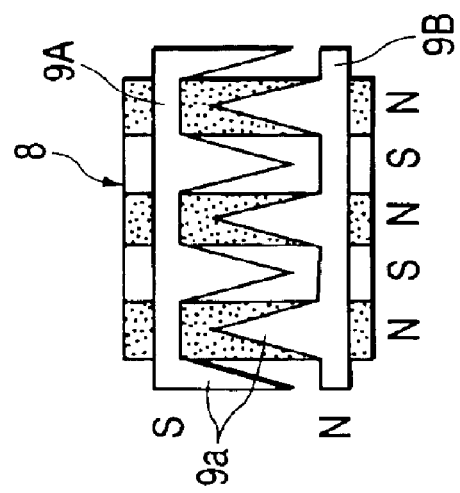
FIGS. 5A to 5C are views explaining the operation of the torque sensor in accordance with the first embodiment of the present invention.
Figure 5B:
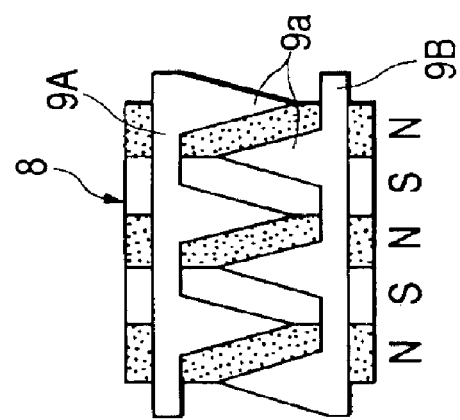

The multipolar magnet 8 and the assembled magnetic yokes 9 are disposed in such a manner that the center of each claw pole 9a of the magnetic yokes 9 agrees with a magnetized boundary line (i.e., a boundary between N-pole and S-pole), to obtain a neutral point where the output (voltage) of magnetic sensor 11 becomes zero in the condition that the torsion bar 7 causes no torsion (i.e., when no steering force is applied between the input shaft 5 and the output shaft 6) as shown in FIG. 5B.

The flux collecting rings 10 have a function of collecting magnetic flux generated from the magnetic yokes 9. The flux collecting rings 10 are made of the soft magnetic material which is used for forming the magnetic yokes 9. Each of the flux collecting rings 10 is equipped with a flux collecting portion 10a which is configured into a plate shape and provided locally at one portion in the circumferential direction.

Figure 6A:
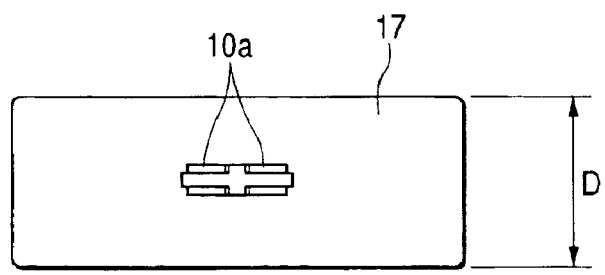
FIG. 6A is a plan view showing resin molded flux collecting rings in accordance with the first embodiment of the present invention.
Figure 6B:
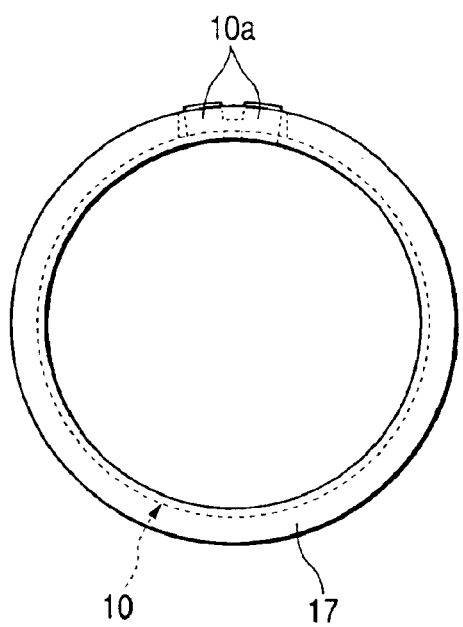
FIG. 6B is a side view showing the resin molded flux collecting rings in accordance with the first embodiment of the present invention.
Figure 6C:
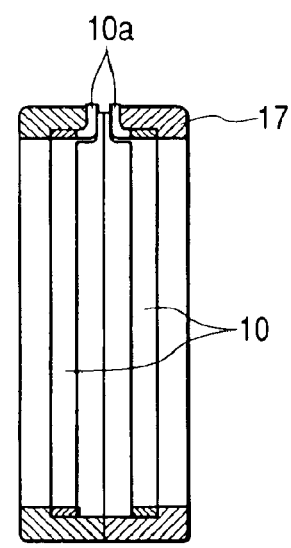
FIG. 6C is a cross-sectional view showing the resin molded flux collecting rings in accordance with the first embodiment of the present invention.

As shown in FIG. 1, two flux collecting rings 10 are opposed to each other at their flux collecting portions 10a via an air gap. The flux collecting rings 10 are integrally molded together by a molding member 17 (refer to FIGS. 6A to 6C). The outer cylindrical surface of the molding member 17 is surrounded by a magnetic shield 18.

Figure 7A:
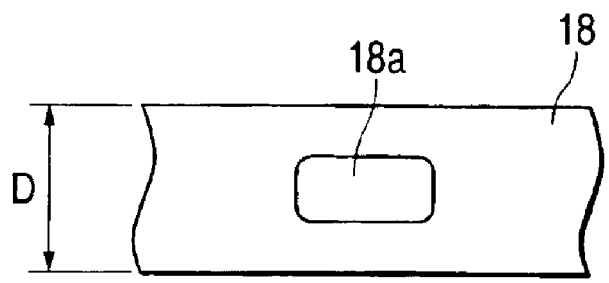
FIG. 7A is a plan view showing a magnetic shield in accordance with the first embodiment of the present invention.
Figure 7B:
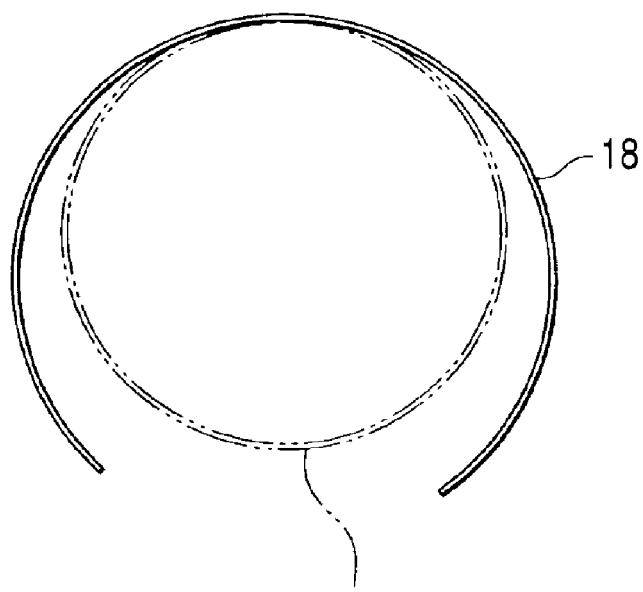
FIG. 7B is a side view showing the magnetic shield in accordance with the first embodiment of the present invention.

The magnetic shield 18 is, for example, made of a steel plate or a comparable magnetic member. More specifically, a belt-like steel plate having a width D substantially identical with that of the molding member 17 is wound around an outer cylindrical surface of the molding member 17 and is fixed as the magnetic shield 18. As shown in FIG. 7A, an aperture 18a is partly opened at a predetermined portion of the magnetic shield 18. The flux collecting portion 10a of respective flux collecting rings 10 are taken out from the aperture 18a.

The set of flux collecting rings 10 being thus surrounded by the magnetic shield 1 is disposed in the vicinity of the outer cylindrical surface of the magnetic yokes 9 as shown in FIG. 2.

The magnetic sensor 11 is, for example, a well known Hall IC and inserted in the air gap of the opposed flux collecting portions 10a of the flux collecting rings 10. The Hall IC is an integrated circuit integrating a Hall element (i.e., a magnetism detecting element) and an amplifying circuit. The magnetic sensor 11 outputs a signal representing the density of magnetic flux generated in the air gap of the opposed flux collecting portions 10a.

The magnetic sensor 11 is composed of two separate sensors which are disposed in parallel with each other with respect to the direction of magnetic flux and have magnetism detecting directions mutually opposed by an angular difference of 180°.

The torque sensor of the above-described embodiment operates in the following manner.

Under the condition that no steering torque is applied to the torsion bar 7, i.e., when the torsion bar 7 causes no torsion or twist displacement, the center of each claw pole 9a of the magnetic yokes 9 agrees with the magnetized boundary line of the multipolar magnet 8 as shown in FIG. 5B. In this case, the amount of magnetic fluxes entering from the N-pole of the multipolar magnet 8 into the claw pole 9a of the magnetic yokes 9 is identical with the amount of magnetic fluxes entering from the S-pole of the multipolar magnet 8 into the claw pole 9a of the magnetic yokes 9. Hence, the magnetic fluxes form a closed loop in each of the magnetic yoke 9A and the magnetic yoke 9B. No magnetic fluxes leak into the air gap between the magnetic yokes 9. The output of magnetic sensor 11 becomes zero.

Figure 5C:
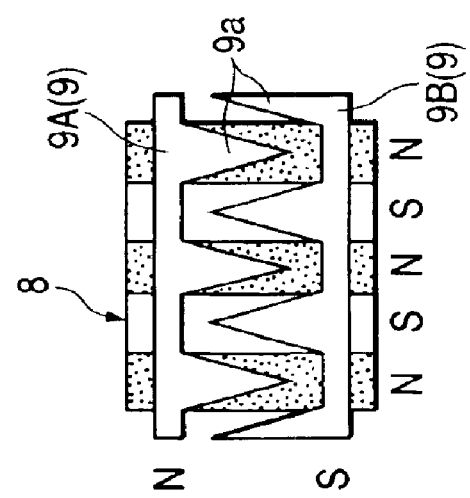

When a steering torque is transmitted to the torsion bar 7 to cause a torsion displacement, the mutual position between the multipolar magnet 8 and the coupled magnetic yokes 9 is changed in the circumferential direction. Accordingly, as shown in FIG. 5A or FIG. 5C, the center of each claw pole 9a of the magnetic yokes 9 deviates from the magnetized boundary line of the multipolar magnet 8 in the circumferential direction. The magnetic fluxes having one polarity increase in one of the magnetic yoke 9A and the magnetic yoke 9B, while the magnetic fluxes having the opposite polarity increase in the other of the magnetic yoke 9A and the magnetic yoke 9B. As a result, positive and negative magnetic fluxes are generated between the magnetic yokes 9. The flux collecting rings 10 attract these positive and negative magnetic fluxes and collect them at their flux collecting portions 10a. The magnetic sensor 11 detects the density of magnetic flux generated between the opposed collecting portions 10a.

According to the above-described embodiment, the torque sensor 1 has one set of flux collecting rings 10 being integrated by resin molding and surrounded by the magnetic shield 18. Thus, it becomes possible to effectively eliminate adverse influence of car speakers or external magnetic fields. The detection error of the magnetic sensor 11 can be further reduced.

Furthermore, the magnetic shield 18 does not cover all of the magnetic circuit of the torque sensor 1. This embodiment only requires winding and fixing the belt-like steel plate (i.e., magnetic member) around the outer cylindrical surface of the molding member 17. Installation of the magnetic shield 18 becomes easy. Furthermore, adding the magnetic shield 18 does not substantially increase the outer diameter of the torque sensor 1. Therefore, the installability of the torque sensor to an automotive vehicle is not worsened.

Second Embodiment

Figure 9:
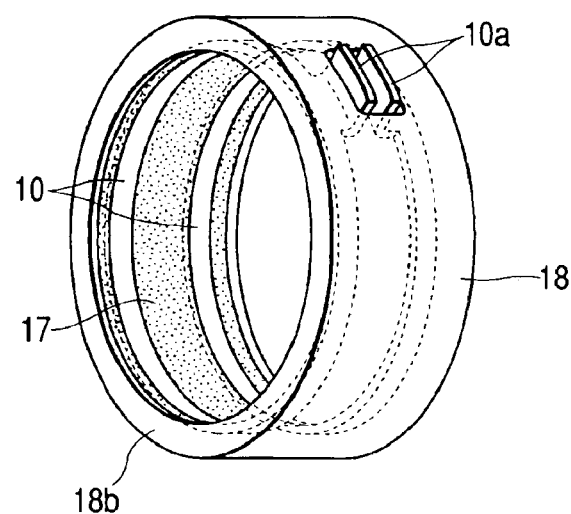
FIG. 9 is a perspective view showing one set of flux collecting rings integrated by resin molding and assembled with a magnetic shield in accordance with a second embodiment of the present invention.

FIG. 9 is a perspective view showing an assembly of one set of flux collecting rings 10 being integrated by resin molding and assembled with a magnetic shield 18 in accordance with another embodiment.

Figures 10A, 10B:
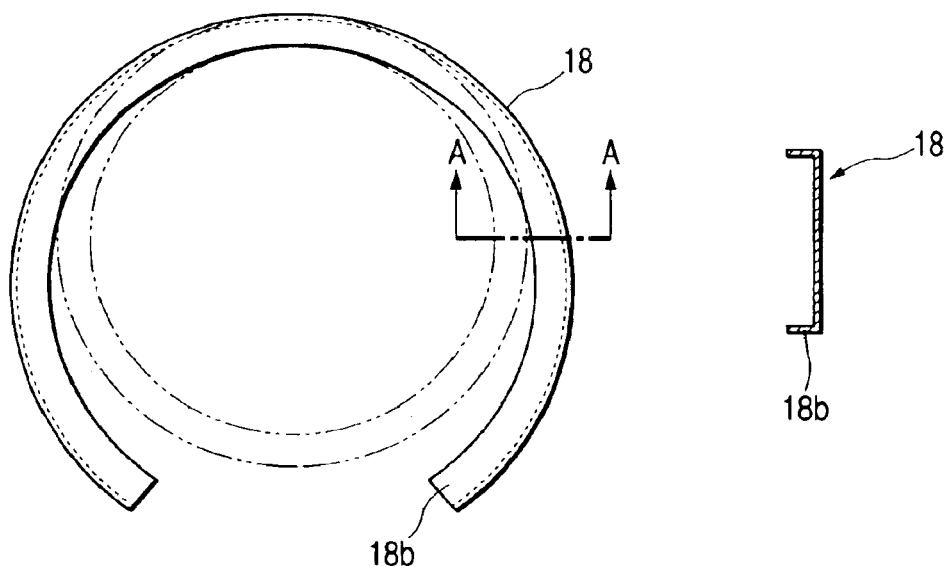
FIG. 10A is a side view showing the magnetic shield in accordance with the second embodiment of the present invention.
FIG. 10B is a cross-sectional view showing the magnetic shield in accordance with the second embodiment of the present invention, taken along a line A—A of FIG. 10A.
Figure 11:
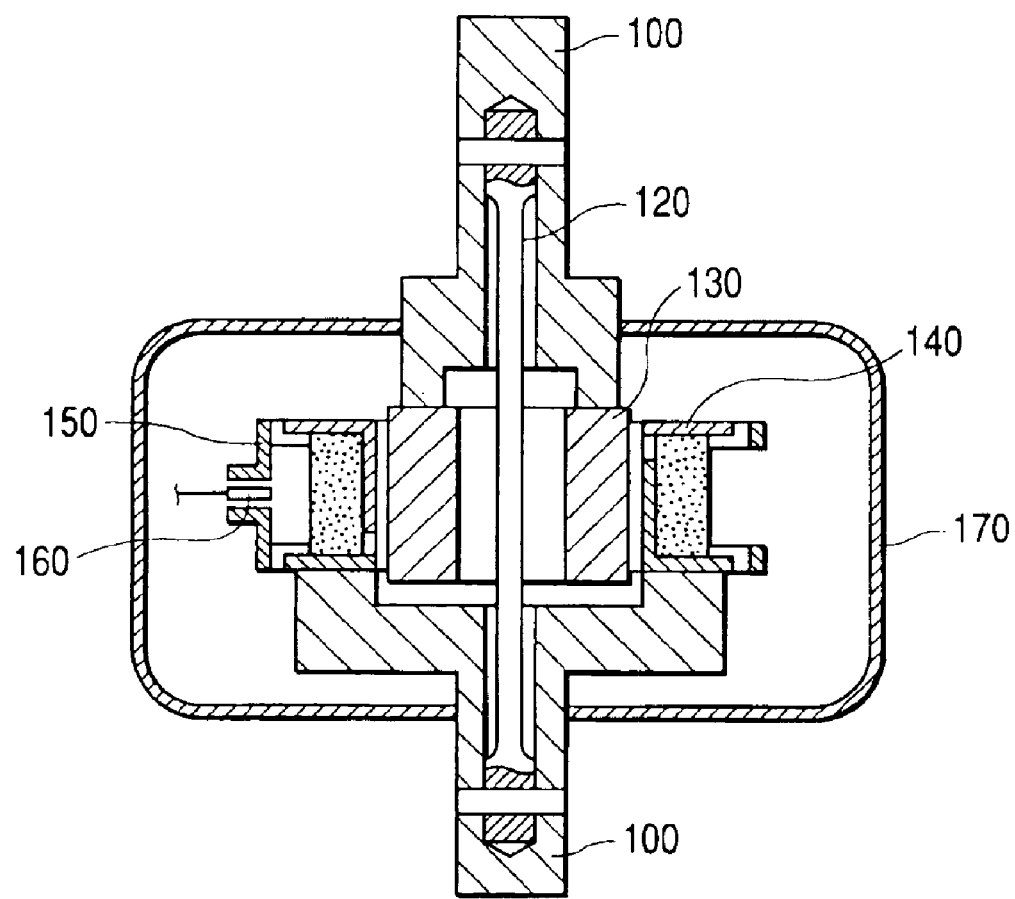
FIG. 11 is a cross-sectional view showing an overall arrangement of a conventional torque sensor.

As shown in FIG. 10B, the magnetic shield 18 of this embodiment has side portions 18b at both ends in axial lateral direction so as to be configured as a whole into U shaped in cross section.

As shown in FIG. 9, the side portions 18b of magnetic shield 18 cover the side surfaces of the molding member 17. Thus, it becomes possible to greatly reduce the adverse influence given by the external magnetic field. The detection error of the magnetic sensor 11 can be further reduced.

Modified Embodiment

According to the first embodiment, the magnetic shield 18 is later fixed to the assembly of the set of flux collecting rings 10 after the resin molding operation is accomplished. It is however possible to integrate the set of flux collecting rings 10 and the magnetic shield 18 by resin molding. Integrating the set of flux collecting rings 10 and the magnetic shield 18 makes it possible to simplify the installation. This magnetic shielding structure is preferably employable for mass production. This modification is also applicable to the second embodiment.

What is claimed is:

1. A torque sensor comprising:
   a first shaft and a second shaft connected coaxially;
   a torsion bar convening a torque applied between said first shaft and said second shaft into a torsion displacement;
   a multipolar magnet fixed to said first shaft or to one end of said torsion bar;
   one set of magnetic yokes fixed to said second shaft or to the other end of said torsion bar and disposed in a magnetic field generated by said multipolar magnet;
   one set of flux collecting rings disposed along an outer surface of said one set of magnetic yokes and opposed to each other via an air gap in an axial direction; and
   a magnetic sensor for detecting the density of magnetic flux generated in said air gap,
   wherein an outer cylindrical surface of said one set of flux collecting rings is surrounded by a magnetic shield, and
   said magnetic shield has side portions covering side surfaces of said one set of flux collecting rings.

2. The torque sensor in accordance with claim 1, wherein said magnetic shield further covers a portion of the magnetic circuit thereof.

3. The torque sensor in accordance with claim 1, further utilized in connection with a power steering apparatus.

4. The torque sensor in accordance with claim 1, wherein said magnetic sensor includes a plurality of sensors disposed in parallel to each other with respect to a direction of magnetic flux.

5. The torque sensor in accordance with claim 1, wherein said magnetic sensor is disposed in said air gap.

6. The torque sensor in accordance with claim 1, wherein said magnetic shield is integrated with said one set of flux collecting rings by resin molding.

7. A torque sensor comprising:
   a first shaft and a second shaft connected coaxially;
   a torsion bar converting a torque applied between said first shaft and said second shaft into a torsion displacement;
   a multipolar magnet fixed to said first shaft or to one end of said torsion bar;
   one set of magnetic yokes fixed to said second shaft or to the other end of said torsion bar and disposed in a magnetic field generated by said multipolar magnet;
   one set of flux collecting rings disposed along an outer surface of said one set of magnetic yokes and opposed to each other via an air gap in an axial direction;
   a magnetic sensor for detecting the density of magnetic flux generated in said air gap; and
   a magnetic shield, wherein an outer cylindrical surface of said one set of flux collecting rings is surrounded by said magnetic shield, and said magnetic shield is integrated with said one set of flux collecting rings by resin molding, and
   wherein said magnetic shield at least one of (i) has side portions covering side surfaces of said one set of flux collecting rings, and (ii) directly covers the outer cylindrical surface of said one set of flux collecting rings.

8. The torque sensor in accordance with claim 7, further utilized in connection with a power steering apparatus.

9. The torque sensor in accordance with claim 7, wherein the magnetic shield includes a steel plate having a same width as a width of said set of flux collecting rings.

10. The torque sensor in accordance with claim 7, wherein the magnetic shield defines an aperture therein, permitting removal of a flux collection portion of said set of flux collecting rings.

11. The torque sensor in accordance with claim 7, wherein said magnetic sensor includes a plurality of sensors disposed in parallel to each other with respect to a direction of magnetic flux.

12. The torque sensor in accordance with claim 7, wherein said magnetic sensor is disposed in said air gap.

13. A torque sensor comprising:
a first shaft and a second shaft connected coaxially;
a torsion bar converting a torque applied between said first shaft and said second shaft into a torsion displacement;
a multipolar magnet fixed to said first shaft or to one end of said torsion bar;
one set of magnetic yokes fixed to said second shaft or to the other end of said torsion bar and disposed in a magnetic field generated by said multipolar magnet;
one set of flux collecting rings disposed along an outer surface of said one set of magnetic yokes and opposed to each other via an air gap in an axial direction; and
a magnetic sensor for detecting the density of magnetic flux generated in said air gap,
wherein an outer cylindrical surface of said one set of flux collecting rings is surrounded by a magnetic shield, and
said magnetic shield is integrated with said one set of flux collecting rings by resin molding.

14. The torque sensor in accordance with claim 13, wherein said magnetic shield further covers a portion of a magnetic circuit thereof.

15. The torque sensor in accordance with claim 13, further utilized in connection with a power steering apparatus.

16. The torque sensor in accordance with claim 13, wherein said magnetic sensor includes a plurality of sensors disposed in parallel to each other with respect to a direction of said magnetic flux.

17. The torque sensor in accordance with claim 13, wherein said magnetic sensor is disposed in said air gap.

18. The torque sensor in accordance with claim 13, wherein said magnetic shield has side portions covering side surfaces of said one set of flux collecting rings and is integrated with said one set of flux collecting rings by resin molding.

19. A torque sensor comprising:
a first shaft and a second shaft connected coaxially;
a torsion bar converting a torque applied between said first shaft and said second shaft into a torsion displacement;
a multipolar magnet fixed to said first shaft or to one end of said torsion bar;
one set of magnetic yokes fixed to said second shaft or to the other end of said torsion bar and disposed in a magnetic field generated by said multipolar magnet;
one set of flux collecting rings disposed along an outer surface of said one set of magnetic yokes and opposed to each other via an air gap in an axial direction; and
a magnetic sensor for detecting the density of magnetic flux generated in said air gap,
wherein an outer cylindrical surface of said one set of flux collecting rings is surrounded by a magnetic shield, and
said magnetic shield directly covers the outer cylindrical surface of said one set of flux collecting rings.

20. The torque sensor in accordance with claim 19, wherein said magnetic shield further covers a portion of a magnetic circuit thereof.

21. The torque sensor in accordance with claim 19, further utilized in connection with a power steering apparatus.

22. The torque sensor in accordance with claim 19, wherein said magnetic sensor includes a plurality of sensors disposed in parallel to each other with respect to a direction of said magnetic flux.

23. The torque sensor in accordance with claim 19, wherein said magnetic sensor is disposed in said air gap.

24. The torque sensor in accordance with claim 19, wherein said magnetic shield has side portions covering side surfaces of said one set of flux collecting rings and is integrated with said one set of flux collecting rings by resin molding.

25. A torque sensor comprising:
a first shaft and a second shaft connected coaxially;
a torsion bar converting a torque applied between said first shaft and said second shaft into a torsion displacement;
a multipolar magnet fixed to said first shaft or to one end of said torsion bar;
one set of magnetic yokes fixed to said second shaft or to the other end of said torsion bar and disposed in a magnetic field generated by said multipolar magnet;
one set of flux collecting rings disposed along an outer surface of said one set of magnetic yokes and opposed to each other via an air gap in an axial direction; and
a magnetic sensor for detecting the density of magnetic flux generated in said air gap,
wherein an outer cylindrical surface of said one set of flux collecting rings is surrounded by a magnetic shield, and
said magnetic shield includes a steel plate having a same width as a width of said one set of flux collecting rings.

26. The torque sensor in accordance with claim 25, wherein said magnetic shield further covers a portion of a magnetic circuit thereof.

27. The torque sensor in accordance with claim 25, further utilized in connection with a power steering apparatus.

28. The torque sensor in accordance with claim 25, wherein said magnetic sensor includes a plurality of sensors disposed in parallel to each other with respect to a direction of said magnetic flux.

29. The torque sensor in accordance with claim 25, wherein said magnetic sensor is disposed in said air gap.

30. The torque sensor in accordance with claim 25, wherein said magnetic shield has side portions covering side surfaces of said one set of flux collecting rings and is integrated with said one set of flux collecting rings by resin molding.

31. A torque sensor comprising:
a first shaft and a second shaft connected coaxially;
a torsion bar converting a torque applied between said first shaft and said second shaft into a torsion displacement; a multipolar magnet fixed to said first shaft or to one end of said torsion bar;
one set of magnetic yokes fixed to said second shaft or to the other end of said torsion bar and disposed in a magnetic field generated by said multipolar magnet;
one set of flux collecting rings disposed along an outer surface of said one set of magnetic yokes and opposed to each other via an air gap in an axial direction; and
a magnetic sensor for detecting the density of magnetic flux generated in said air gap,
wherein an outer cylindrical surface of said one set of flux collecting rings is surrounded by a magnetic shield, and
said magnetic shield defines an aperture therein, permitting removal of a flux collection portion of said one set of flux collecting rings.

32. The torque sensor in accordance with claim 31, wherein said magnetic shield further covers a portion of a magnetic circuit thereof.

33. The torque sensor in accordance with claim 31, further utilized in connection with a power steering apparatus.

34. The torque sensor in accordance with claim 31, wherein said magnetic sensor includes a plurality of sensors disposed in parallel to each other with respect to a direction of said magnetic flux.

35. The torque sensor in accordance with claim 31, wherein said magnetic sensor is disposed in said air gap.

36. The torque sensor in accordance with claim 31, wherein said magnetic shield has side portions covering side surfaces of said one set of flux collecting rings and is integrated with said one set of flux collecting rings by resin molding.

* * * * *